(12) United States Patent
Preku

(10) Patent No.: US 11,752,813 B2
(45) Date of Patent: Sep. 12, 2023

(54) LAWN TRACTOR HITCH

(71) Applicant: John Preku, Little Rock, AR (US)

(72) Inventor: John Preku, Little Rock, AR (US)

( * ) Notice: Subject to any disclaimer, the term of this patent is extended or adjusted under 35 U.S.C. 154(b) by 131 days.

(21) Appl. No.: 17/466,548

(22) Filed: Sep. 3, 2021

(65) Prior Publication Data
US 2022/0363095 A1 Nov. 17, 2022

Related U.S. Application Data

(60) Provisional application No. 63/188,666, filed on May 14, 2021.

(51) Int. Cl.
*B60D 1/02* (2006.01)

(52) U.S. Cl.
CPC .................... *B60D 1/025* (2013.01)

(58) Field of Classification Search
CPC ................. B60D 1/02; B60D 1/025
See application file for complete search history.

(56) References Cited

U.S. PATENT DOCUMENTS

| | | | | |
|---|---|---|---|---|
| 1,842,697 A * | 1/1932 | Anderson | B60D 1/025 280/515 |
| 1,887,054 A * | 11/1932 | Wood | B60D 1/02 280/515 |
| 2,140,132 A * | 12/1938 | Hollett | B60D 1/025 280/492 |
| 2,476,511 A * | 7/1949 | Ruth | B60D 1/02 280/515 |
| 2,478,736 A * | 8/1949 | Balzen | B60D 1/025 280/515 |
| 2,525,471 A * | 10/1950 | Balzer | B60D 1/02 213/189 |
| 3,190,677 A * | 6/1965 | Robbins | B60D 1/025 280/515 |
| 4,447,071 A * | 5/1984 | Kaplan | B60D 1/02 280/482 |
| 6,679,512 B1 * | 1/2004 | Plessala | B60D 1/025 280/460.1 |
| 7,398,987 B2 * | 7/2008 | Roe | B60D 1/28 280/515 |
| 8,360,460 B1 * | 1/2013 | Jarvis | B60D 1/02 280/515 |
| 9,242,519 B2 * | 1/2016 | Terpsma | B60D 1/28 |
| 11,034,197 B2 * | 6/2021 | Swenson | B60D 1/025 |
| 11,472,241 B2 * | 10/2022 | Baik | B60D 1/025 |
| 2015/0251505 A1 * | 9/2015 | Rodda | B60D 1/025 280/515 |

FOREIGN PATENT DOCUMENTS

DE 20108736 U1 * 8/2001 ............... B60D 1/02

* cited by examiner

*Primary Examiner* — Kevin Hurley
(74) *Attorney, Agent, or Firm* — Brennan, Manna & Diamond, LLC

(57) ABSTRACT

The present invention is an improved aftermarket lawn tractor hitch. The improved aftermarket hitch includes an upper support plate or member for attaching the plate to the tractor, a hitch pin for connecting to the towable implement, a compression spring surrounding the pin for holding the hitch pin in a closed position, and a lower support member. The user can open the hitch pin by lifting the handle on one end of the pin thereby releasing the tongue of the towable implement, which is held between the lower support member and the conventional tow tab.

14 Claims, 8 Drawing Sheets

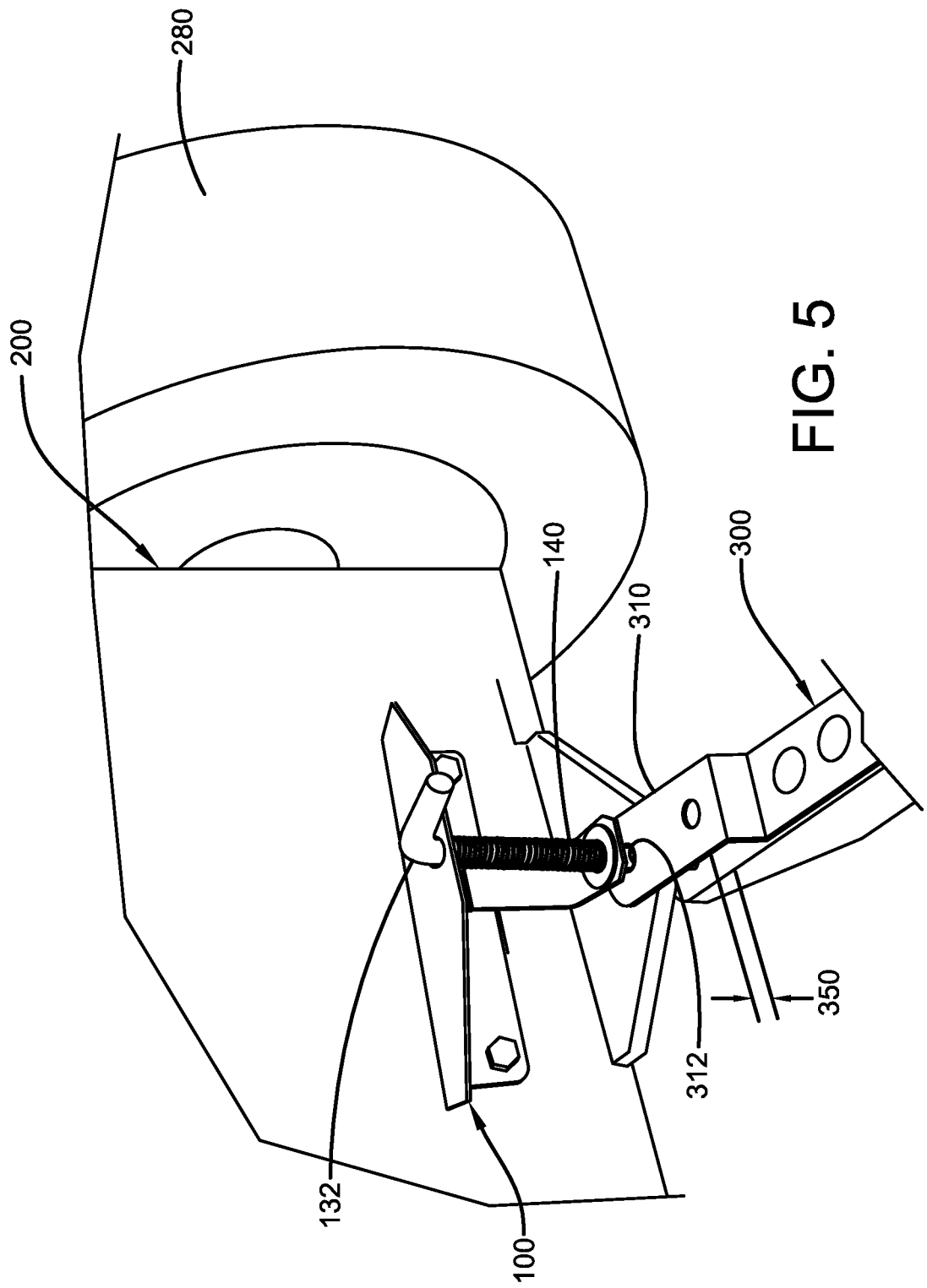

LAWN TRACTOR HITCH

CROSS-REFERENCE TO RELATED APPLICATION

The present application claims priority to, and the benefit of, U.S. Provisional Application No. 63/188,666, which was filed on May 14, 2021 and is incorporated herein by reference in its entirety.

FIELD OF THE INVENTION

The present invention relates generally to the field of riding mower lawn tractors and small utility tractors. More specifically, the present invention relates to an improved hitch that may be installed onto a riding lawn mowers or lawn tractors for the purpose of towing various accessories such as trailers, wagons, leaf collectors, seeders, fertilizer spreaders, rakes, brush hogs and the like. The improved lawn tractor hitch is manufactured as an add-on device for a conventional riding lawn tractor since many conventional riding lawn tractors do not include a towing hitch. The hitch may be installed as an aftermarket implement. Instead, many riding lawn mowers or lawn tractors only include a tow tab by which additional components must be added before it can tow a trailer or other towable implements. The improved lawn mower or lawn tractor hitch is installed on the rear portion of the riding lawn mower or tractor in a location directly above the existing tow tab, and works in conjunction with the conventional tow tab to provide a spring-loaded mechanism that is used for towing and engaging the tow bar of the implement. Accordingly, the present disclosure makes specific reference thereto. Nonetheless, it is to be appreciated that aspects of the present invention are also equally applicable to other like applications, devices and methods of manufacture.

BACKGROUND OF THE INVENTION

By way of background, riding mowers or lawn tractors are commonly used to tow various implements behind the lawn mower or tractor including trailers, wagons, leaf collectors, seed/fertilizer spreaders, rakes and the like. Currently, many riding lawn mowers or tractors include a tow tab that is located on the rear of the riding lawn mower or tractor, which includes an opening or hole in a plate that extends outward from the chassis for attaching various towable implements. The towable implement includes an extended portion at the front end of the implement for attaching to the tractor, commonly referred to as the trailer tongue. The trailer tongue also includes an opening for attaching it to the riding lawn mower or tractor.

The problem arises when the user attempts to connect the towable implement to the riding lawn mower or tractor. Both the tractor and the towable implement include openings for connecting to one another, but neither includes a hitching pin mechanism or other element to secure the implement to the riding lawn mower or tractor. This requires the user to purchase and attach a separate hitch pin or clip to connect the towable implement to the riding lawn tractor. The separate hitch pin mechanism can be difficult to install and can be easily misplaced when it is not in use. Further, since the tow tab is typically located near the lowest point in the rear of the riding lawn mower or tractor, usually at approximately at the same height as the rear wheel radius, the user must bend over or get on his or her knees to attach the conventional hitch pin between the lawn tractor and the towable implement, thus leading to potential back or knee pain for the user.

Therefore, there exists a long felt need in the art for an improved riding lawn mower or tractor hitch that can be easily installed onto a conventional riding lawn tractor. There is also a long felt need in the art for an improved lawn tractor hitch that can be easily used for connecting various towable implements to the rear portion of the riding lawn mower or tractor. Additionally, there is a long felt need in the art for an improved lawn tractor hitch that can be permanently attached to the riding lawn mower or tractor, even when it not in use, so that it is not misplaced or is required to be stored-away when it is not being used. Further, there is a long felt need in the art for an improved lawn tractor hitch that does not require the user to bend over or to get down on his or her knees to connect the towable implement to the riding lawn tractor, thus reducing the likelihood of causing back or knee pain and/or injuries to the user. Finally, there is a long felt need in the art for an improved lawn tractor hitch that is relatively inexpensive to manufacture, can be provided as an aftermarket accessory and reduces the required time needed to connect a towable implement to a riding lawn tractor.

The subject matter disclosed and claimed herein, is an improved lawn tractor hitch that is designed to be installed onto an existing chassis element of a riding lawn tractor at a location on the rear of the tractor and at a distance above the conventional tow tab, which is commonly included on riding lawn tractors. The improved lawn tractor hitch includes an upper support member for attaching the device to the riding lawn tractor, a hitch pin for connecting to the towable implement, a compression spring for holding the hitch pin in a first or closed position and allows for further compression of the pin when the user desires to slide the hitch pin into a second or released position. A lower support member for slidably supporting the hitch pin is provided and limits the downward motion of the spring and hitch pin. A washer and/or snap ring is used for attaching to the hitch pin. The compression spring is supported by the upper support member at its upper end and is secured by the lower support member at its lower end. The compression spring is typically made from steel or stainless steel, is appropriately sized such that it can keep the hitch pin in the closed position during use and can be further compressed by the user by pulling the pin in an upward motion on the hitch pin handle, such that the tongue of the towable implement can then be inserted into the space created between the lower support member of the improved lawn tractor hitch and the conventional tow tab.

In this manner, the improved lawn tractor hitch of the present invention accomplishes all of the forgoing objectives, while providing a quick and easy solution for use when connecting or removing towable implements from a riding lawn mower or tractor. The improved lawn tractor hitch of the present invention is also user friendly, since it stays attached to the riding lawn mower or tractor even when it is not in use, thereby eliminating the need to store a separate hitch pin mechanism when it is not needed. The improved lawn tractor hitch of the present invention easily connects and removes towable implements from a riding lawn mower or tractor by simply having the user pull or release the handle portion of the hitch pin from a standing position, thus reducing the likelihood of causing back or knee pain/injuries since the user does not have to bend over or get onto his or her knees to make the connection when using the improved hitch device.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises an improved lawn tractor hitch for installing onto the chassis of a riding lawn mower or tractor at a location on the rear of the tractor chassis or frame and at a distance above the conventional tow tab that is commonly included on riding lawn mowers and tractors. The improved lawn tractor hitch includes an upper support member for attaching the hitch to the riding lawn tractor, and a hitch pin for connecting to the towable implement. A compression spring is provided for holding the hitch pin in a first or closed position and allows for further compression of the pin when the user desires to move the hitch pin into a second or released position. A lower support member is provided for slidably supporting the hitch pin and for limiting downward motion of the spring and hitch pin. A washer and/or snap ring is used for attaching to the hitch pin. The components of the improved hitch are preferably made from metal and may be joined together by any conventional means such as welding, fastening, fusing or the like. The compression spring is supported by the upper support member at its upper end and is secured by the lower support member at its lower end.

The compression spring is typically made from steel, stainless steel, various metal alloys or other suitably rigid and strong materials, is appropriately sized such that the spring can keep the hitch pin in the first or closed position during use and can be further compressed by the user by pulling in an upward motion on the hitch pin handle such that the tongue of the towable implement can then be inserted into the space created between the lower support member of the improved lawn tractor hitch and the conventional tow tab. A locking mechanism may also be provided for holding the position in the open position to allow the user to insert the tongue of the implement in the open space so that both hands can be used to position the tongue in the opening. The preferred vertical distance between the lower support member and the conventional tow tab is approximately 1.25 inches so that the improved hitch can accommodate most towable implements that are designed for riding lawn tractors.

In a further embodiment of the present invention, an improved lawn tractor hitch for installing onto a frame or chassis of a riding mower or lawn tractor at a location on the rear of the tractor and at a height as determined by the user such that it is compatible with most towable implements that may be connected to the lawn tractor is disclosed. In this particular embodiment, the conventional riding lawn tractor may have a location for mounting the improved lawn tractor hitch, but does not include a conventional tow tab.

The improved lawn tractor hitch includes an upper support member for attaching the device to the riding lawn mower or lawn tractor, a hitch pin for connecting to the towable implement, and a compression spring for holding the hitch pin in a first or closed position and allows for further compression when the user desires to move the hitch pin into the second or released position. A lower support member is provided for slidably supporting the hitch pin and for limiting downward motion of the spring and hitch pin. A washer and/or snap ring is used for attaching to the hitch pin, and an integral tow tab is suitably sized and positioned to receive the end of the hitch pin. The compression spring is supported by the upper support member at its upper end and is secured by the lower support member at its lower end. The integral tow tab may be formed as a portion of the upper support member or the lower support member, or may be optionally made to attach to the lower support member by welding, fasteners, fusion, bonding or by other connection means. The preferred vertical distance between the lower support member and the integral tow tab is approximately 1.25 inches so that the improved hitch can accommodate most towable implements that are designed for riding lawn tractors.

In yet another embodiment of the present invention, a method of installing and using an improved riding lawn mower or tractor hitch is disclosed and comprises the steps of locating the correct mounting location for the improved hitch on the rear of the riding lawn tractor, and then drilling the mounting holes into the rear section of frame or chassis of the conventional riding lawn tractor. Next, the improved hitch is attached using bolts, nuts or other fasteners. The hitch handle is raised, and the tongue of the towable implement is inserted into space created below the lower support member. The hitch handle is lowered or released so that the hitch handle engages with the tongue of the towable implement so that the two are now connected to one another and forming the improved hitch.

The improved riding lawn tractor hitch of the present invention is particularly advantageous as it may be used in conjunction with various types of riding lawn mowers, utility tractors and various towable implements that may be used with such tractors. The improved hitch comes in various configurations, may be painted any color based on the user's desires and may include logos and other instructional decals without limitation. The improved lawn tractor hitch may include an integral tow tab for conventional lawn tractors that do not come equipped with a tow tab installed. Additionally, the integral tow tab component of the improved lawn tractor hitch may be optionally configured as a separate component that can be selectively attached or removed from the improved hitch depending on the needs of the user.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which:

FIG. 5 is a perspective view of the embodiment of the present invention shown in FIG. 3 installed on the rear portion of a riding lawn tractor with a towable trailer attached thereto as per the disclosed design;

DETAILED DESCRIPTION OF THE INVENTION

Figure 1:
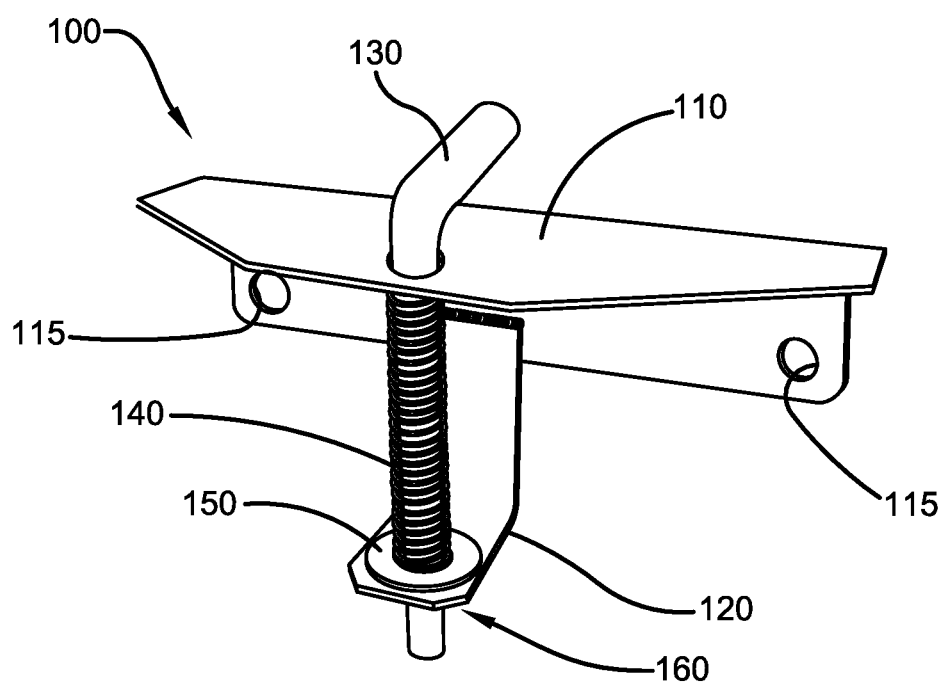
FIG. 1 illustrates a perspective view of one potential embodiment of the improved riding lawn tractor hitch of the present invention as per the disclosed design.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long felt need in the art for an improved lawn tractor hitch that can be easily installed onto a frame or chassis of a conventional riding lawn mower or lawn tractor. There is also a long felt need in the art for an improved lawn tractor hitch that can be easily used for connecting various towable implements to the rear portion of the riding lawn tractor. It should be understood that while one embodiment is to attach the hitch to the rear portion of the frame or chassis, the hitch may also be attached to the front of the riding lawn mower or tractor so that a plow, for example, may be attached to the front of the tractor. Additionally, there is a long felt need in the art for an improved lawn tractor hitch that can be permanently attached to the riding lawn tractor, even when it not in use, so that it is not misplaced or is required to be stored-away when it is not being used. Further, there is a long felt need in the art for an improved lawn tractor hitch that does not require the user to bend over or to get down on his or her knees to connect the towable or pushable implement to the riding lawn tractor, thus reducing the likelihood of causing back or knee pain and/or injuries to the user. Finally, there is a long felt need in the art for an improved lawn tractor hitch that is relatively inexpensive to manufacture and that reduces the required time needed to connect a towable implement to a riding lawn tractor.

The present invention, in one exemplary embodiment, is an improved lawn tractor hitch that is designed to be installed onto a riding lawn mower or tractor at a location on the rear or front of the tractor and at a distance above the conventional tow tab, which is commonly included on riding lawn tractors. The improved lawn tractor hitch includes an upper support member for attaching the device to the riding lawn mower or tractor, a hitch pin for connecting to the towable (or pushable) implement, and a compression spring for holding the hitch pin in a first or closed position and allows for further compression when the user desires to move the hitch pin into the second or released position. A lower support member is included for slidably supporting the hitch pin and for limiting downward motion of the spring and hitch pin, and a washer and/or snap ring for attaching to the hitch pin. A locking pin may also be included which can be used to hold the pin in the open position to allow an individual to use both hands to position the tongue of the element in position before releasing the pin to the closed position. The compression spring is supported by the upper support member at its upper end, and is secured by the lower support member at its lower end. The compression spring is typically made from steel, stainless steel, metal alloys or other suitable rigid and durable materials, and is appropriately sized such that it can hold the hitch pin in the closed position during use, and can be further compressed by the user by pulling in an upward motion on the hitch pin handle such that the tongue of the towable implement can then be inserted into the space created between the lower support member of the improved lawn tractor hitch and the conventional tow tab.

Referring initially to the drawings, FIG. 1 illustrates a perspective view of one potential embodiment of the improved riding lawn mower or tractor hitch of the present invention as per the disclosed design. The improved lawn tractor hitch 100 includes an upper support member 110, a lower support member 120, a hitch pin 130, and a compression spring 140. The upper support member 110 includes two or more openings 115 in its vertical side portion for fasteners that will be used for attaching the improved hitch 100 to a chassis or frame of a riding lawn tractor. The hitch can be attached to the front or back of the tractor chassis so as to allow for both towable and pushable elements to be connected and used by the tractor. The hitch pin 130 is slidably attached to the upper support member 110 and the lower support member 120 as further described in FIG. 2. The compression spring 140 is initially slightly compressed when it is installed over hitch pin 130 and is held in place at the top by the upper support member 110 and by a washer 150 at its lower end. The washer 150 is held in place on the hitch pin 130 and is further limited in downward travel by a snap ring 160, which snaps into a groove 138 (see FIG. 2) on the hitch pin 130.

In this arrangement, the hitch pin 130 can be selectively positioned by the user. In the closed or first position, as further described in FIG. 4A, the compression spring 140 is slightly compressed, which causes the hitch pin 130 to be held in the closed position. The closed position is the normal operating position of the device when the user is not applying force to the hitch pin handle portion 132. When a user pulls upward on the handle portion 132 of the hitch pin 130, the compression spring 140 is further compressed, thus allowing the hitch pin 130 to be raised into the open or second position, as further described in FIG. 4B. With the hitch pin 130 in the open position, a towable trailer or other implement, including a pushable one 300, can be either attached to or removed from the improved trailer hitch 100 as shown in FIG. 5.

Figure 2:
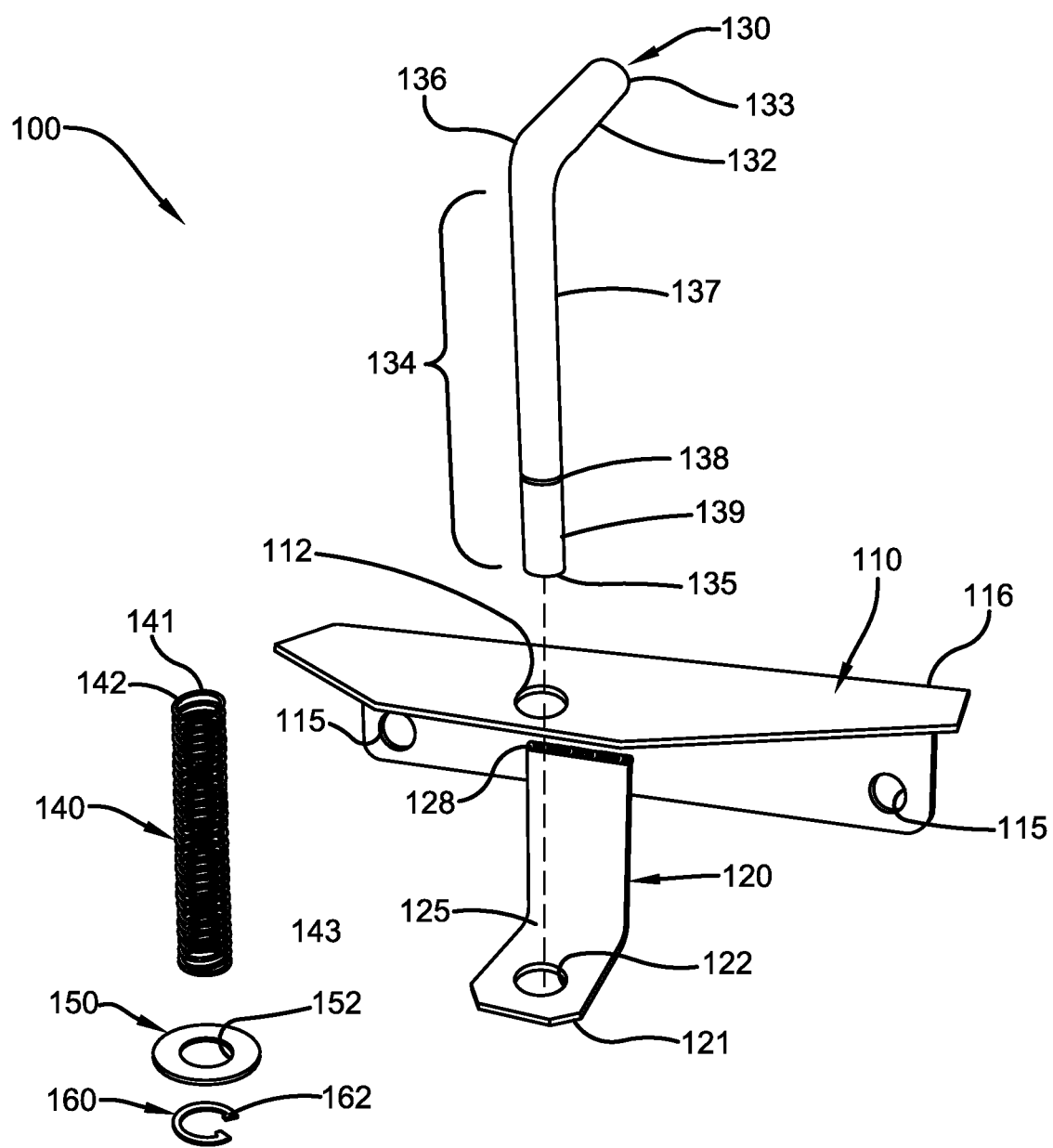
FIG. 2 shows a perspective exploded view of the embodiment of the present invention shown in FIG. 1 as per the disclosed design.

FIG. 2 illustrates a perspective exploded view of the embodiment of the present invention shown in FIG. 1 as per the disclosed design. With the components of the improved lawn tractor hitch 100 now shown in the exploded view, further detail of the components can be described. The tractor hitch 100 is sized and configured to be positioned above the existing tow element provided on the frame or chassis of the riding lawn mower or tractor. The upper support member 110 is preferably made from metal such as steel or on other metal alloy having a nominal thickness of approximately 0.25 inches. The bend 116 is made in the upper support member 110 such that a vertical portion will be sized appropriately to include openings 115 for attaching the improved hitch to the rear portion of a riding lawn mower or tractor. Further, the upper support member 110 includes an opening 112 in its horizontal portion to accommodate and slidably support the hitch pin 130.

The lower support member 120 is also preferably made from metal or a metal alloy such as steel having a nominal thickness about the same as the upper support member 110. The lower support member 120 also preferably includes a bend 126 such that it has a vertical portion for attaching to the upper support member 110 and a horizontal portion that includes an opening 122. The opening 122 is sized to accommodate and slidably support the hitch pin 130. The upper support member 110 and the lower support member 120 are preferably joined together by one or more welds 128. While it is shown in FIG. 2 with the upper support member 110 and lower support member 120 as initially separate components until they are welded together, it is possible that the two components could be integrated into one that is stamped and an integrally formed part, thus eliminating the need for the weld 128.

Figure 4A:
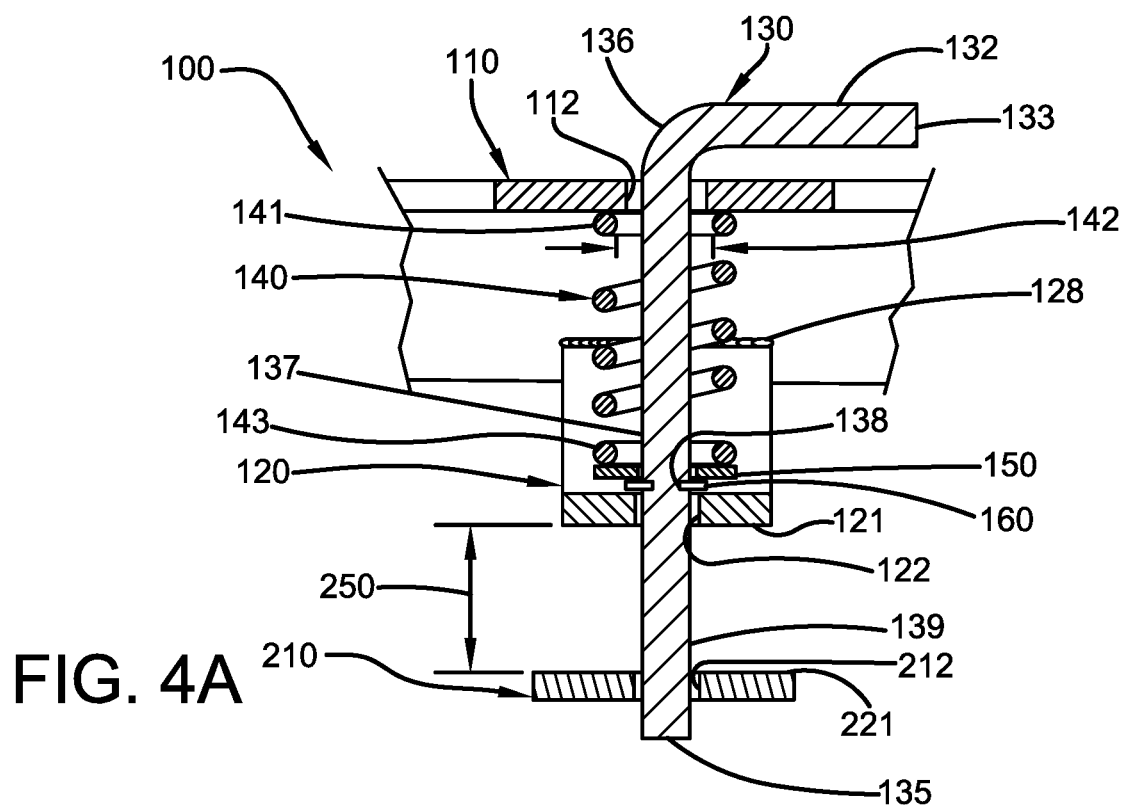
FIG. 4A depicts a partial sectional view of the embodiment of the present invention shown in FIG. 3 installed on the rear portion of a riding lawn tractor with the hitch pin in the closed position as per the disclosed design.

Hitch pin 130 is typically made from a conventional round, steel bar stock of approximately 0.375 to 0.500 inches in diameter. The bend 136 in the hitch pin 130 creates a handle portion 132 and a vertical portion 134. The length of the handle portion 132 can be selected such that it is easy to grip by the user. when the handle portion 132 is in the horizontal portion of the hitch pin 130 located between the first end 133 and the bend 136. The vertical portion 134 of the hitch pin 130 includes a spring-retaining section 137 and a towing or tongue engagement section 139. The groove 138 separates the two sections of the vertical portion 134 and is sized for snap ring 160. The compression spring 140 is sized to slide over the vertical portion 134 of the hitch pin 130. The spring opening 142 is slightly larger in diameter than that of the hitch pin 130. The vertical portion 134 of the hitch pin 130 needs to be long enough such that the second end 135 can extend through the opening 212 of the tow tab 210 as shown in FIG. 4A. The length of the spring-retaining section needs to be sized based on the characteristics and dimensions of the compression spring 140 and offset distance 250, which is set to accommodate the tongue thickness 350 of various towable trailers 300 as shown in FIG. 5.

The compression spring 140 is supported by the upper support plate 110 at its upper end 141, and by the washer 150 at its lower end 143. In the closed position as shown in FIG. 4A, the compression spring is slightly compressed. The washer 150 has an opening 152 sized to allow it to slide over the hitch pin vertical portion 134. The washer 150 is further supported by the snap ring 160, which prevents the downward sliding motion of the washer and the compression spring 140 on the vertical portion 134 of the hitch pin 130. The snap ring 160 has an opening 162 sized to snap into place around the groove 160 that is machined into the vertical portion 134. Snap ring 160 can be inserted or removed from the groove 138, thus allowing the compression spring 140 to be serviced or replaced if needed. Alternatively, the washer 150 could be welded to the vertical portion 134, thus eliminating the need for the snap ring 160 and groove 138 as a cost-savings option. However, this design option would also make it more difficult to replace the compression spring 140 if it needs to be serviced.

Figure 3:
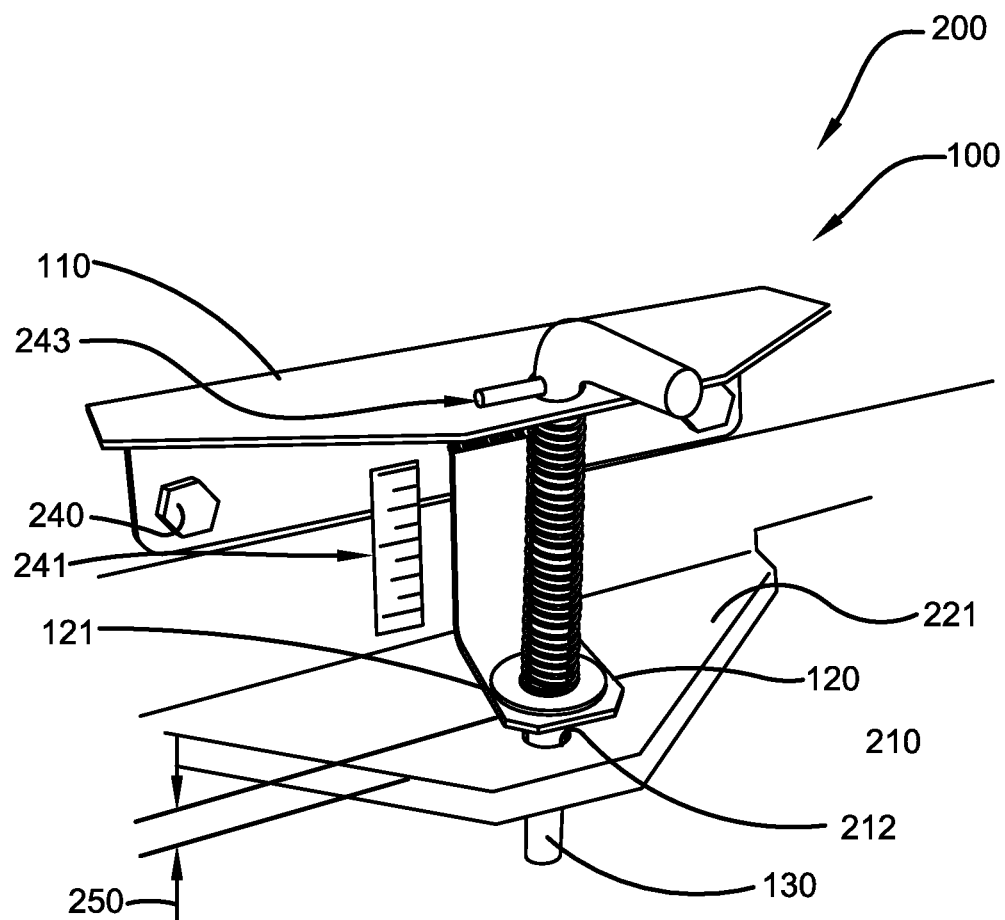
FIG. 3 provides a perspective view of the embodiment of the present invention shown in FIG. 1 installed on the rear portion of a riding lawn tractor as per the disclosed design.

FIG. 3 illustrates a perspective view of the embodiment of the present invention shown in FIG. 1 installed on the rear portion of a riding lawn tractor as per the disclosed design. It should be understood that, the hitch could also be installed on the front of the tractor chassis so that the tractor could be used to push implements such as a snow plow. A portion of a conventional riding lawn mower or tractor 200 is shown in FIG. 3, which includes a conventional tow tab 210. The tow tab 210 may be represented in different configurations based on the tractor manufacturer and user desires. In general, tow tab 210 includes an opening 212 for attaching a conventional hitch pin kit (not shown). In the present invention, the improved lawn tractor hitch is positioned above the existing conventional tow tab 210 and is attached to the riding lawn mower or tractor 200 using conventional fasteners 240. Two fasteners 240, preferably having a diameter of 0.3125 inches are sized to be inserted through the openings 115 in the upper support member 110. Once the proper location is selected for mounting, the user can drill or otherwise create two or more holes through the rear (or front) portion of the riding lawn mower or tractor 200 to accept fasteners 240.

The offset distance 250 is defined as the vertical spacing between the bottom surface 121 of the lower support member 120 on the improved hitch 100 and the top surface 221 of the tow tab 210. The offset distance 250 is determined based on the tongue thickness 350 of the towable trailer or implement 300 (or pushable implement if the hitch is attached to the front of the frame or chassis) (see FIG. 5). The user determines the proper offset distance 250 when selecting the mounting location of the improved hitch 100. The offset distance needs to be greater than the largest tongue thickness 350. In addition, the maximum offset distance 250 is determined by the length of the second end 135 of the hitch pin 130 such that the second end 135 must be able to extend into the opening 212 of the tow tab 210 when the improved hitch 100 is in the closed position (see FIG. 4A). FIG. 3 also provides a gauge 240 so that a user can determine the height to pull the pin and a locking pin 241 which is further illustrated in FIG. 4B to hold the pin in position and allow the user to use both hands to position the tongue of the implement.

FIG. 4A illustrates a partial sectional view of the embodiment of the present invention shown in FIG. 3 installed on the rear portion of a riding lawn tractor with the hitch pin in the closed position as per the disclosed design. The mechanical movement of the hitch pin 130 of the improved lawn tractor hitch 100 can now be described in more detail, first in the closed position as shown in FIG. 4A. With the proper offset distance 250 selected, the second end 135 of the hitch pin 130 is shown extending through the opening 212 in the tow tab 210, which is found on the riding lawn mower or tractor 200. When installing the improved hitch 100, the user first aligns the towing section 139 of the hitch pin 130 with the opening 212 in the tow tab 210. Next, the user slides the improved hitch 100 vertically until the proper offset distance 250 is established. Finally, the user can mark and drill holes through the rear section of the chassis or frame of the riding lawn mower or tractor 200 and attach the improved hitch 100 using fasteners 240 as previously described.

When the improved hitch 100 is in the closed position, the compression spring 140 is slightly compressed, which causes the compression spring 140 to press against the upper support member 110 at the upper end 141 and to press against the washer 150 at the lower end 143. As shown in FIG. 4A, the washer 150 is also in contact with the snap ring 160, which is inserted into the groove 138 on the hitch pin 130. As discussed previously, the washer 150 can also be welded to the hitch pin 130, thereby eliminating the need for the snap ring 160 and groove 138, but making it more difficult to replace the compression spring 140 if necessary. The compression spring 140 slides freely over the spring-retaining section 137 of the hitch pin 130, having a spring opening 142 slightly larger than the diameter of the spring-retaining section 137 of the hitch pin 130. The hitch pin 130 is sized to be slightly smaller in diameter than each of the openings (112, 122, and 212) that it is slidably supported therein.

The hitch pin 130 is preferably made by bending a piece of round bar stock to create a handle portion 132 at the first end 133 and a vertical portion 134 at the second end 135. It is preferably made from one piece, forming the bend 136 as shown at approximately a 90-degree angle. While the one-piece construction has many advantages including ease of manufacturing and cost, it is conceivable that other shapes and configurations could also be considered.

The upper support member 110 and the lower support member 120 are preferably joined together by one or more welds 128. Preferably, as shown in the figures herein, the upper support member 110 and lower support member 120 are initially separate components until they are welded together, it is possible that the two components could be integrated into one stamped and formed part, thus eliminating the need for the weld 128.

Figure 4B:
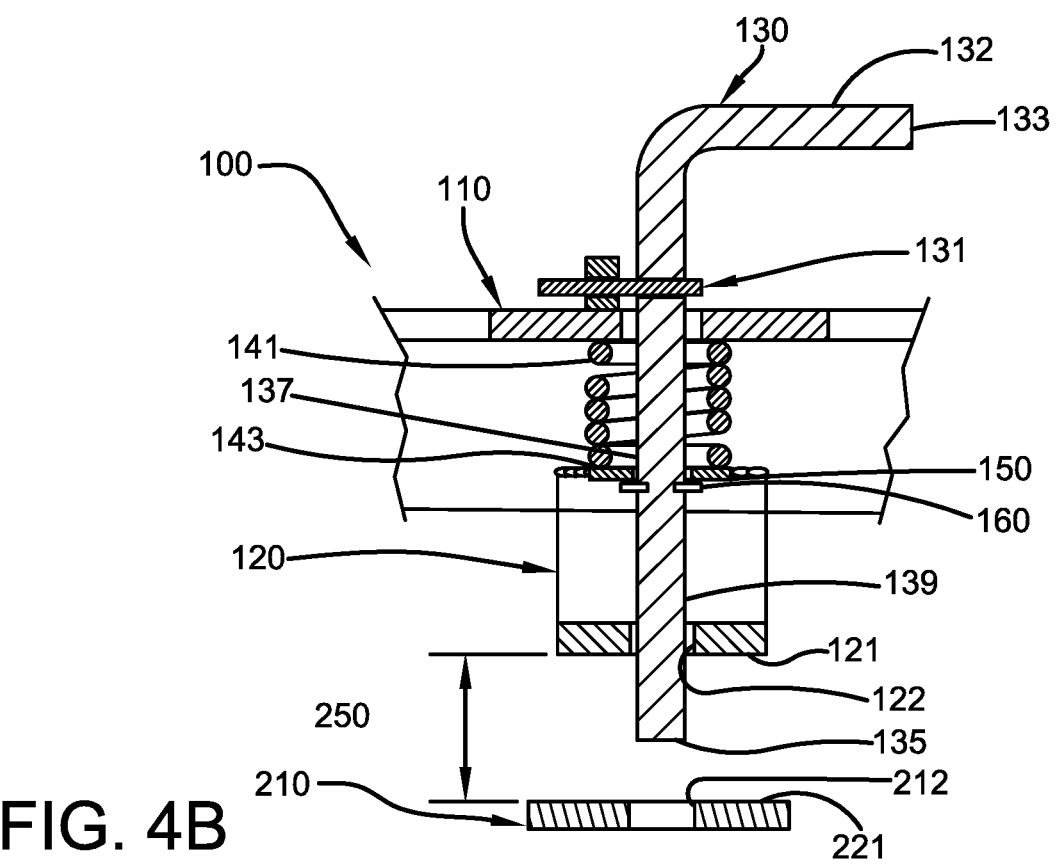
FIG. 4B displays a partial sectional view of the embodiment of the present invention shown in FIG. 3 installed on the rear portion of a riding lawn tractor with the hitch pin in the released or open position as per the disclosed design.

FIG. 4B illustrates a partial sectional view of the embodiment of the present invention shown in FIG. 3 installed on the chassis or frame and in this embodiment on the rear portion of a riding lawn mower or tractor with the hitch pin in the released or open position as per the disclosed design. Referring to the item numbers previously described in FIG. 4A, the improved lawn tractor hitch 100 will now be described in the open position for connecting or disconnecting a towable trailer or other implement 300 as shown if FIG. 5. To connect or disconnect a towable trailer or other implement 300, the user simply grasps the handle portion 132 of the hitch pin 130 and pulls upward on the handle, thus raising it as shown in FIG. 4B. With the towing section 139 of the hitch pin 130 raised as shown, the towable trailer or other implement 300 can be connected to or disconnected from the improved hitch 100. The raising of the hitch pin 130 causes the compression spring 140 to further compress, thus increasing the force required to raise the handle portion 132. The increased force in the compression spring 140 and/or the complete closure of the spring coils will limit any further upward motion of the handle portion 132. A locking pin 131 may be provided that inserts in an opening in the pin to hold the pin in position so that the user is free to use both hands to position the tongue of the implement before removing the pin 131 and releasing the hitch to connect the implement. A bracket 133 may be provided to assist in the sliding or positioning of the locking pin.

FIG. 5 illustrates a perspective view of the embodiment of the present invention shown in FIG. 3 installed on the rear portion of the frame or chassis of a riding lawn mower or tractor 200 with a towable trailer or other implement 300 attached thereto as per the disclosed design. The improved lawn tractor hitch 100 is shown in the closed position with the towable trailer 300 connected thereto. The towable trailer 300 is connected to the improved hitch 100 by inserting the towing section 139 of the hitch pin 130 through the opening 312 in the trailer tongue 310. The desired mounting location of the improved hitch 100 is shown on the rear of the riding lawn mower or tractor 200 at a vertical distance above the tow tab 210 whereby the offset distance 250 needs to be larger than the tongue thickness 350, as previously described. Typically, the tow tab 210 is relatively low to the ground and is approximately in-line with the center of the tractor rear tire 280.

The handle portion 132 of the hitch pin 130 is conveniently located for easy reach by the user. This allows the user to easily grasp and raise the handle portion 132 from a standing position, thus eliminating the need to bend over or get down on his or her knees. Since the compression spring 140 holds the hitch pin 130 in the closed position, the improved hitch 100 can stay permanently attached to the rear of the riding lawn mower or tractor 200, thereby eliminating the need to remove and store the novel hitch when it is not in use.

Figure 6A:
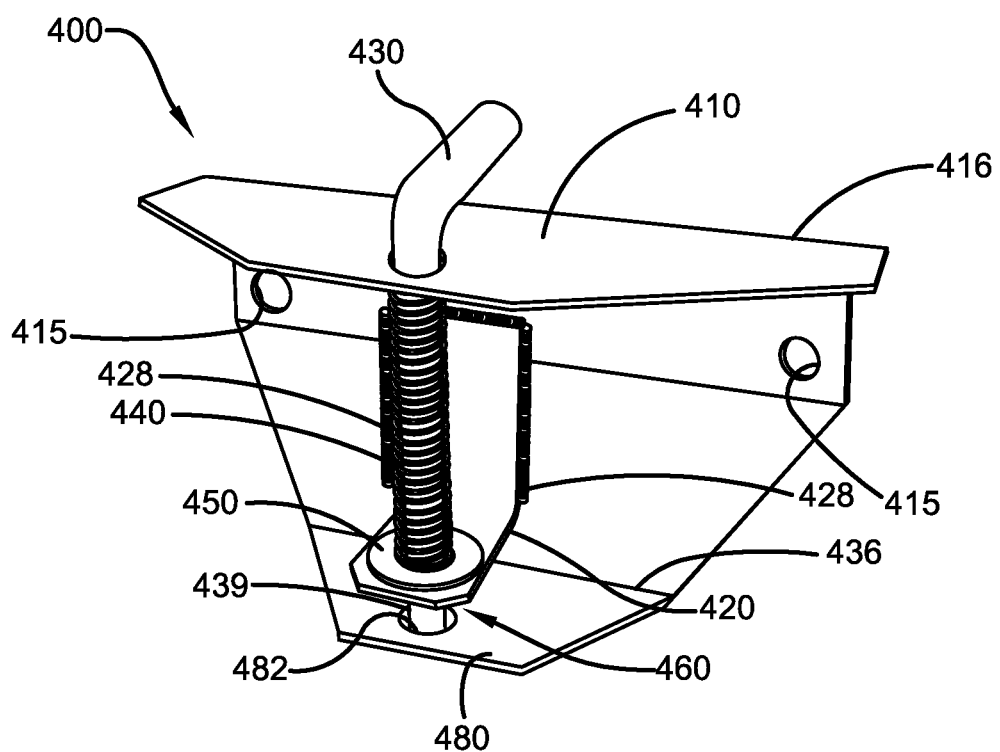
FIG. 6A illustrates a perspective view of another potential embodiment of the improved riding lawn tractor hitch of the present invention including an integral tow tab as per the disclosed design.

FIG. 6A illustrates a perspective view of another potential embodiment of the improved riding lawn tractor hitch of the present invention including an integral tow tab as per the disclosed design. In this particular embodiment, the conventional riding lawn tractor may have a location for mounting the improved lawn tractor hitch 400 but does not include a conventional tow tab.

The improved lawn tractor hitch 400 includes an upper support member 410 for attaching an implement, whether to be towed or pushed, to the riding lawn mower or tractor, a hitch pin 430 for connecting to the towable trailer or other implement 300, a compression spring 440 for holding the hitch pin 430 in a closed position and allowing for further compression of the spring when the user desires to move the hitch pin 430 into the released position, a lower support member 420 for slidably supporting the hitch pin 430 and for limiting downward motion of the compression spring 440 and hitch pin 430, a washer 450 and/or snap ring 460 for attaching to the hitch pin 430 and an integral tow tab 480 suitably sized and positioned to receive the tongue of the towing section 439 of the hitch pin 430 through an opening 482 formed therein. The compression spring 440 is supported by the upper support member 410 at its upper end and is supported by the lower support member 420 at its lower end (similar to the embodiment described previously in FIGS. 1-5).

The integral tow tab 480 may be formed as a portion of the upper support member 410 as shown or may be optionally formed as part of the lower support member 420. The preferred vertical distance between the lower support member 420 and the integral tow tab 480 is approximately 1.25 inches so that the improved hitch 400 can accommodate most towable implements such as trailers 300 that are designed for riding lawn mowers or small utility tractors. The upper support member 410 and the integral tow tab may be formed from one piece of metal having bends 416 and 436 as shown. The lower support member 420 may be formed from one piece of metal having a bend 426 and welds 428 to attach it to the upper support member 410. Alternatively, the lower support member 410 could be made as a flat plate without the bend 426, and welded to the upper support member 410.

Figure 6B:
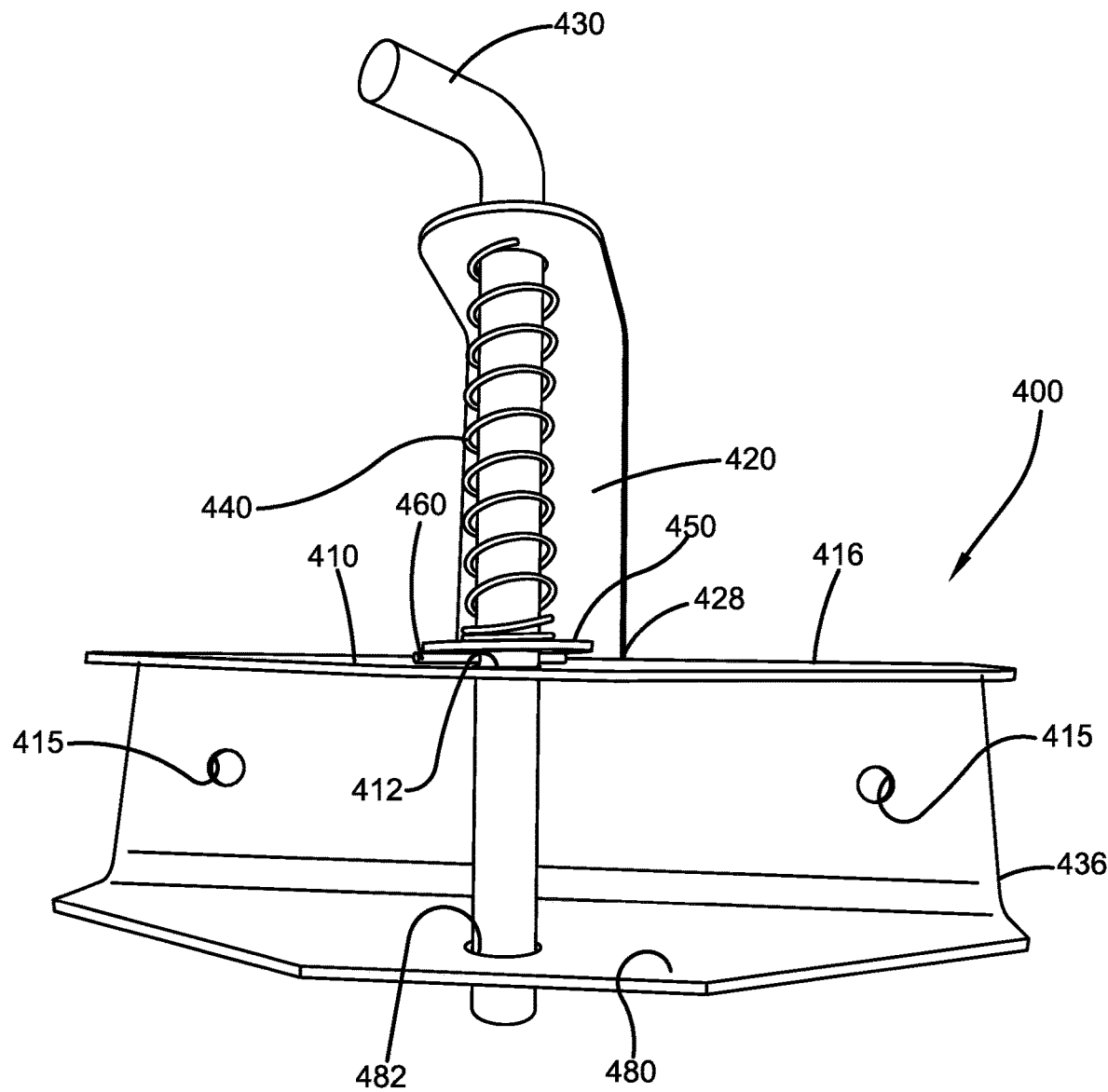
FIG. 6B illustrates a perspective view of another potential embodiment of the improved riding lawn tractor hitch of the present invention including an integral tow tab as per the disclosed design, wherein the hitch is designed for a turn mower.

FIG. 6B illustrates a perspective view of another potential embodiment of the improved riding lawn tractor hitch 400 of the present invention including an integral tow tab 480 as per the disclosed design, wherein the hitch 400 is designed for a turn mower or lawn mower. In this embodiment, the hitch 400 includes an upper support member 410 for attaching an implement, whether to be towed or pushed, to the turn mower, a hitch pin 430 for connecting to the towable trailer or other implement 300 located above the upper support member 410, a compression spring 440 also located above the upper support member for holding the hitch pin 430 in a closed position and allowing for further compression of the spring 440 when the user desires to move the hitch pin 430 into the released position, a lower support member 420 that in this embodiment is located above the upper support member 410 that slidably supports the hitch pin 430 and limits downward motion of the compression spring 440 and hitch pin 430, a washer 450 and/or snap ring 460 for attaching to the hitch pin 430 and an integral tow tab 480 suitably sized and positioned above the upper support member to receive the tongue of the towing section 439 of the hitch pin 430 through an opening 482 and a continuous opening 412 in the upper support member 410 formed therein. The compression spring 440 is supported by the upper support member 410 at its lower end and is also supported by the lower support member 420 at its upper end, in contrast to previously described embodiments.

The integral tow tab 480 may be formed as a portion of the upper support member 410 as shown or may be optionally formed as part of the lower support member 420. The preferred vertical distance between the lower support member 420 and the integral tow tab 480 is approximately 1.25 inches so that the improved hitch 400 can accommodate most towable implements such as trailers 300 that are designed for riding lawn mowers or small utility tractors. The upper support member 410 and the integral tow tab may be formed from one piece of metal having bends 416 and 436 as shown. The lower support member 420 may be formed from one piece of metal having a bend 426 and welds 428 to attach it to the upper support member 410. Alternatively, the lower support member 410 could be made as a flat plate without the bend 426, and welded to the upper support member 410.

The improved lawn tractor hitch 400 can be attached to the rear portion of the frame or chassis of the riding lawn tractor or turn mower using fasteners 240 as previously described by marking and drilling holes through the rear portion of the lawn tractor using the openings 415 that are formed in the upper support member 410. Alternatively, other attachment means, such as welding, could be used in place of fasteners 240. The hitch may also be attached to a front portion of the chassis or frame so that the hitch element could be used to provide an attachment such as a snow plow to the front of the tractor or lawn mower.

The improved lawn tractor hitches 100 and 400 may be made available in different sizes, configurations, designs and colors to accommodate user need and/or preference, and the exact size, measurement, construction and design specifications of the improved hitch of the present invention may vary upon manufacturing or the particular material that is used. The improved hitch may further comprise logos, indicia, trademarks, geometric patterns, customizable colors and fonts, embroidery and prints and/or images on its surface.

Figure 7:
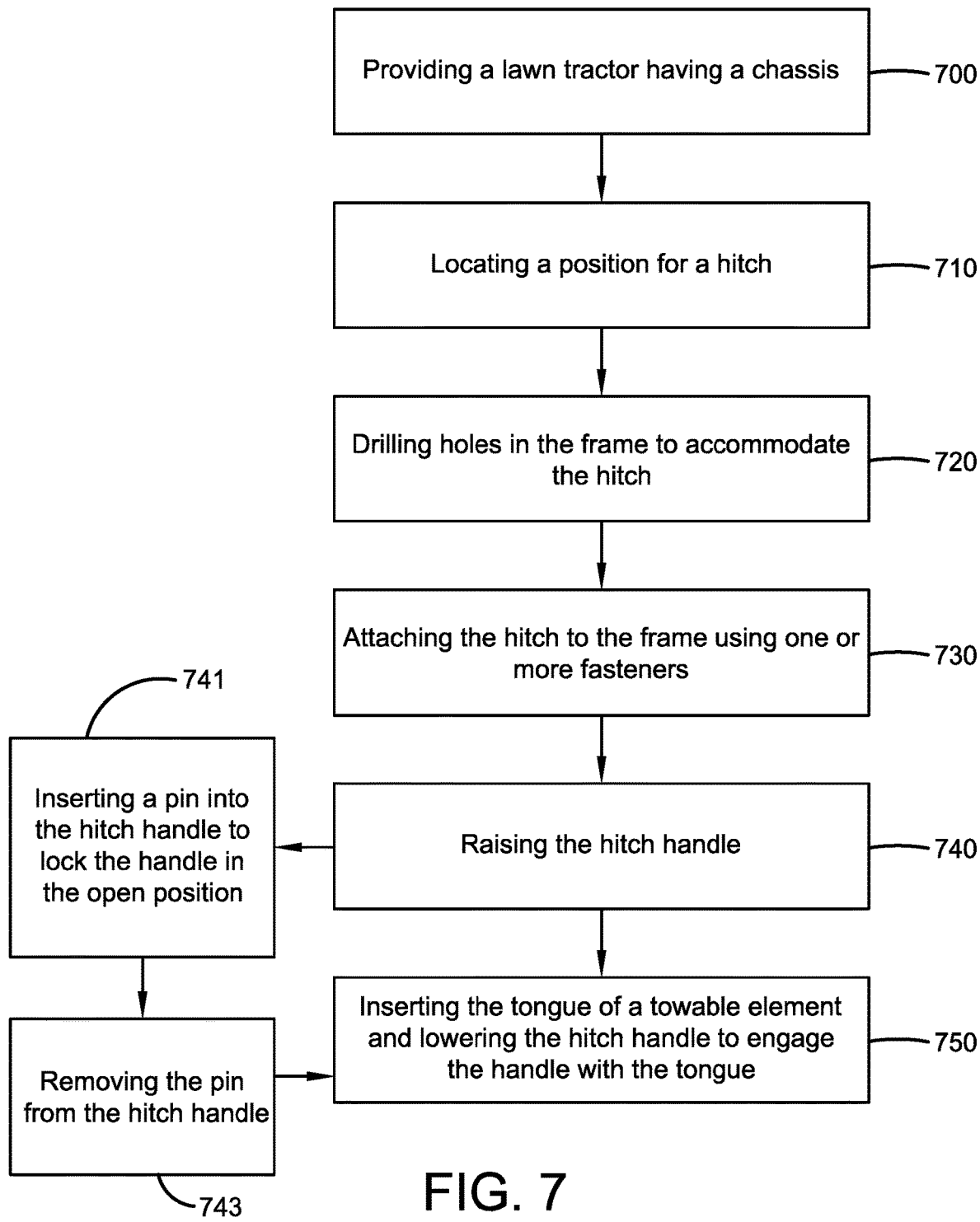
FIG. 7 provides a block diagram of an exemplary method of installing the hitch of the present invention.

FIG. 7 shows a block diagram for an exemplary method of installing the hitch of the present invention and includes the steps of providing a riding lawn mower or tractor at step 700 and then locating a position for the hitch placement at step 710. Mounting holes are drilled into the frame or chassis at step 720. The hitch is attached using fasteners at step 730. The handles are raised at step 740 so that the tongue of the implement can be positioned on the hitch and inserted in the hitch opening at step 750. Additional steps may include providing a locking pin at step 741 and then removing the locking pin from the handle at step 743.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "improved lawn tractor hitch", "improved tractor hitch", and "improved hitch" are interchangeable and refer to the improved lawn tractor hitches 100 and 400 of the present invention.

Notwithstanding the forgoing, the improved lawn tractor hitches 100 and 400 of the present invention can be of any suitable size and configuration as is known in the art without affecting the overall concept of the invention, provided that it accomplishes the above-stated objectives. One of ordinary skill in the art will appreciate that the size, configuration and material of each of the improved lawn tractor hitches 100 and 400 as shown in the FIGS. are for illustrative purposes only, and that many other sizes and designs of the improved lawn tractor hitches 100 and 400 are well within the scope of the present disclosure. Although the dimensions of each of the improved lawn tractor hitches 100 and 400 are important design parameters for user convenience, the improved lawn tractor hitches 100 and 400 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An aftermarket accessory for a riding lawn mower, the aftermarket accessory comprising:
   a mounting plate having at least one opening therein for securing the mounting plate to a chassis or frame of the riding lawn mower;
   a pin repositionable between a first position and a second position, the pin having a handle and an end opposite the handle;
   a compressible spring disposed on and around the pin, wherein the compressible spring changes compression between the first position and the second position; and
   the end of the pin being configured to fit within a tow tab on the chassis or frame of the riding lawn mower, wherein the pin includes a groove disposed near the end and a snap ring to hold the compressible spring on the pin.

2. The aftermarket accessory as recited in claim 1, wherein the first position is a closed position and the second position is an open position.

3. The aftermarket accessory as recited in claim 2, wherein the open position is of a sufficient dimension to accommodate a tongue of an implement.

4. The aftermarket accessory as recited in claim 3, wherein the mounting plate may be positioned on either a front portion or a rear portion of the frame or chassis of the riding lawn mower.

5. The aftermarket accessory as recited in claim 1, wherein the mounting plate is fastened to the chassis or frame by a fastener.

6. The aftermarket accessory as recited in claim 1, wherein the mounting plate is sized and configured to fit above the tow tab on a chassis or frame of a riding lawn mower.

7. The aftermarket accessory as recited in claim 1 further comprising a locking pin insertable into the pin to hold the pin in the second position.

8. The aftermarket accessory as recited in claim 1, wherein the compressible spring has a greater compression in the second position than the first position.

9. A riding lawn mower or tractor system comprising;
   a riding lawn mower or tractor having a chassis or frame;
   a tow tab disposed on the chassis or frame; and
   an aftermarket hitch sized and configured to fit above the tow tab, wherein the aftermarket hitch is comprised of a mounting plate and a pin encircled by a compression spring, wherein the compression spring is held in position by a groove and a snap ring or washer, and further wherein the pin is comprised of a handle and an end for insertion into a hole in the tow tab.

10. The riding lawn mower or tractor system as recited in claim 9, wherein the pin is repositionable between a first position to a second position.

11. The riding lawn mower or tractor system as recited in claim 10, wherein the first position is a closed position and the second position is an open position.

12. The riding lawn mower or tractor system as recited in claim 11, wherein the compression spring is under a greater compression in the open position than in the closed position.

13. The riding lawn mower or tractor system as recited in claim 10, wherein the pin comprises a locking pin for use when the pin is in the second position.

14. The riding lawn mower or tractor system as recited in claim 9, wherein the aftermarket hitch is secured to the frame or chassis of the riding lawn more by a fastener.

* * * * *